(12) United States Patent
Satoh

(10) Patent No.: US 8,970,799 B2
(45) Date of Patent: Mar. 3, 2015

(54) LIQUID CRYSTAL DISPLAY DEVICE AND METHOD OF MANUFACTURING THE SAME

(75) Inventor: Eiichi Satoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 151 days.

(21) Appl. No.: 13/562,042

(22) Filed: Jul. 30, 2012

(65) Prior Publication Data

US 2013/0021553 A1  Jan. 24, 2013

Related U.S. Application Data

(63) Continuation of application No. PCT/JP2012/001590, filed on Mar. 8, 2012.

(30) Foreign Application Priority Data

Jul. 19, 2011  (JP) ................................. 2011-157438

(51) Int. Cl.
   *G02F 1/136*  (2006.01)
   *G02F 1/1362*  (2006.01)
   *G02F 1/1343*  (2006.01)

(52) U.S. Cl.
   CPC .... *G02F 1/136227* (2013.01); *G02F 1/134363* (2013.01); *G02F 2001/136218* (2013.01)
   USPC ................................. 349/43; 349/51; 349/139

(58) Field of Classification Search
   USPC .......................................................... 349/43
   See application file for complete search history.

(56) References Cited

U.S. PATENT DOCUMENTS

| 6,498,369 B1 | 12/2002 | Yamazaki et al. |
| 6,646,288 B2 | 11/2003 | Yamazaki et al. |
| 2001/0010576 A1 | 8/2001 | Lee et al. |
| 2003/0052336 A1* | 3/2003 | Yamazaki et al. ............ 257/200 |

(Continued)

FOREIGN PATENT DOCUMENTS

| CN | 1272695 A | 11/2000 |
| CN | 101750818 A | 6/2010 |

(Continued)

OTHER PUBLICATIONS

International Search Report issued in International Patent Application No. PCT/JP2012/001590, filed on Mar. 8, 2012.

(Continued)

*Primary Examiner* — Bumsuk Won
*Assistant Examiner* — Edmond Lau
(74) *Attorney, Agent, or Firm* — McDermott Will & Emery LLP

(57) ABSTRACT

A liquid crystal display device includes a pair of transparent substrates facing each other through a liquid crystal layer disposed therebetween; a gate insulating film formed so as to cover a gate electrode formed in the pixel regions, disposed closer to the liquid crystal layer, of one of the transparent substrates; a semiconductor film provided on the gate insulating film, for forming a thin-film transistor; a first electrode provided on the semiconductor film through the first insulating film and the second insulating film; a second electrode provided on the first electrode through a third insulating film; and a contact hole formed collectively in the first insulating film, the second insulating film, and the third insulating film on the first electrode, where a second electrode is formed on the contact hole. A floating electrode is formed in the peripheral region of the contact hole.

5 Claims, 4 Drawing Sheets

(56) References Cited

U.S. PATENT DOCUMENTS

| | | |
|---|---|---|
| 2008/0204648 A1 | 8/2008 | Tanaka et al. |
| 2009/0115950 A1* | 5/2009 | Toyota et al. ............. 349/114 |
| 2009/0121996 A1 | 5/2009 | Takano et al. |
| 2010/0053529 A1* | 3/2010 | Kanaya et al. ............ 349/139 |
| 2010/0123845 A1* | 5/2010 | Kim et al. .................. 349/46 |

FOREIGN PATENT DOCUMENTS

| | | |
|---|---|---|
| JP | 11-202356 | 7/1999 |
| JP | 2009-109930 | 5/2009 |
| JP | 2009-122299 | 6/2009 |
| JP | 2009-186869 | 8/2009 |
| JP | 2010-054649 | 3/2010 |
| JP | 2010-145449 | 7/2010 |

OTHER PUBLICATIONS

English Translation of Chinese Search Report issued on Sep. 29, 2014 for the related Chinese Patent Application No. 201280001076.5.

* cited by examiner

LIQUID CRYSTAL DISPLAY DEVICE AND METHOD OF MANUFACTURING THE SAME

RELATED APPLICATIONS

This application is a Continuation of International Application No. PCT/JP2012/001590, filed on Mar. 8, 2012, which in turn claims the benefit of Japanese Application No. 2011-157438, filed on Jul. 19, 2011, the disclosures of which Applications are incorporated by reference herein.

TECHNICAL FIELD

The present invention relates to a liquid crystal display device, particularly to one based on a technology called IPS (in-plane switching), and to a method of manufacturing the devices.

BACKGROUND ART

A liquid crystal display device based on a technology called IPS has a pair of transparent substrates disposed facing each other through a liquid crystal. Each pixel region of one of the transparent substrates closer to the liquid crystal has a pixel electrode; and a common electrode for generating an electric field (lateral electric field) parallel to the transparent substrates, between the pixel electrode and the common electrode. The amount of light transmitting through a region between the pixel electrode and the common electrode is regulated by controlling driving the liquid crystal according to an electric field. Such a liquid crystal display device is known as being capable of providing unchanged display images even if viewed from a diagonal direction with respect to the screen surface (excellent in so-called wide viewing angle characteristics).

Conventionally, in such a liquid crystal display device, a pixel electrode and a common electrode have been formed of a conductive layer that does not transmit light. In recent years, however, the following type has been known. That is, common electrodes made of transparent electrodes are formed on the entire area of the region excluding around the pixel regions, and strip-shaped pixel electrodes are formed on the common electrodes through an insulating film.

With a liquid crystal display device thus structured, a lateral electric field is generated between a pixel electrode and a common electrode, which provides excellent wide viewing angle characteristics and a higher aperture ratio (refer to patent literature 1 for example).

Meanwhile, a liquid crystal display device with the diagonal electric field method has been developed. In the device, pixel electrodes and common electrodes for applying an electric field to the liquid crystal layer are disposed on different layers through an insulating film. The device provides a wider viewing angle and a higher contrast than the IPS method, and further the device can be driven at low voltage and has a high transmittance, thereby featuring bright display.

However, the device involves the following problems. That is, the potential difference between a drain signal line and a pixel electrode causes orientation misalignment, which produces a region that does not contribute to display near a signal line to decrease the aperture ratio. Further, coupling capacitance produced between a signal line and a pixel electrode likely degrades display quality (e.g. crosstalk).

Hence, a liquid crystal display device is devised in which pixel electrodes and common electrodes are disposed on an interlayer resin film in order to reduce such influence by potential of a signal line (refer to patent literatures 2 and 3 for example).

However, a request has been made for providing a liquid crystal display device with a higher aperture ratio (transmittance) and a method of manufacturing the device at low cost.

CITATION LIST

Patent Literature

PTL 1 Japanese Patent Unexamined Publication No. H11-202356

PTL 2 Japanese Patent Unexamined Publication No. 2009-122299

PTL 3 Japanese Patent Unexamined Publication No. 2010-145449

SUMMARY OF THE INVENTION

A liquid crystal display device of the present invention includes a pair of transparent substrates; a gate insulating film; a switching element; a first electrode; a second electrode; and a contact hole. The pair of transparent substrates facing each other through a liquid crystal layer is disposed therebetween. The gate insulating film is formed so as to cover the gate electrode formed in the pixel regions, disposed closer to the liquid crystal layer, of one of the transparent substrates. The switching element is formed of a thin-film transistor provided on the gate insulating film. The first electrode is provided on the switching element through an insulating film. The second electrode is provided on the first electrode through an insulating film and is connected to the electrode of the switching element. The contact hole is collectively formed in the insulating film on the switching element and in the insulating film on the first electrode. The second electrode is formed at contact hole. The liquid crystal display device has a floating electrode (simultaneously with the first electrode) formed in the peripheral region of the contact hole in the insulating film on the switching element.

A method of manufacturing a liquid crystal display device, of the present invention is one manufacturing a device that includes a pair of transparent substrates; a gate insulating film; a switching element; a first electrode; a second electrode; and a contact hole.

The pair of transparent substrates of the liquid crystal display device facing each other through a liquid crystal layer is disposed therebetween. The gate insulating film is formed so as to cover a gate electrode formed in the pixel regions, disposed closer to the liquid crystal layer, of one of the transparent substrates. The switching element is formed of a thin-film transistor provided on the gate insulating film. The first electrode is provided above the switching element through an insulating film. The second electrode is provided over the first electrode through an insulating film and is connected to the electrode of the switching element. The contact hole is collectively formed in the insulating film on the switching element and the insulating film on the first electrode for accommodating the second electrode to be formed.

The method of manufacturing liquid crystal display devices is as follows. After an insulating film is formed on a switching element, a first electrode is patterned on the insulating film while a floating electrode is formed in a peripheral region where the contact hole is formed. Then after an insulating film is formed on the first electrode, the contact hole is collectively formed in the multiple insulating films to expose part of the electrode of the switching element outside, and then the electrode of the switching element is connected to the second electrode.

In this way, the present invention allows providing a liquid crystal display device with a high aperture ratio (transmittance) and low cost and a method of manufacturing the device.

DESCRIPTION OF EMBODIMENT

Exemplary Embodiment

Hereinafter, a description is made of a liquid crystal display device and a method of manufacturing the device according to an embodiment of the present invention using FIGS. 1 through 4E.

Figure 1:
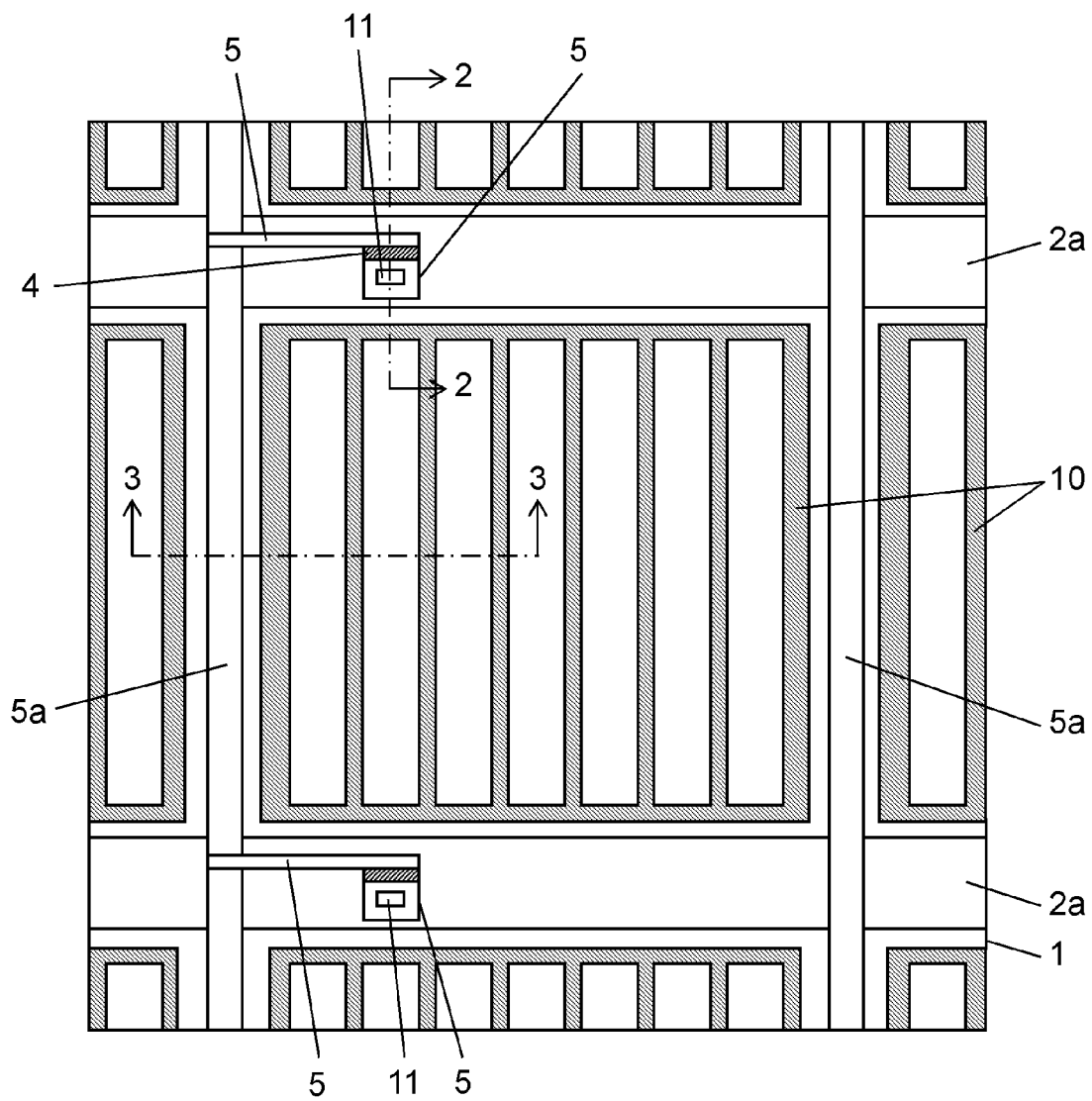
FIG. 1 is a plan view showing the structure of the substantial part for one pixel, of a liquid crystal display device according to an embodiment of the present.
Figure 2:
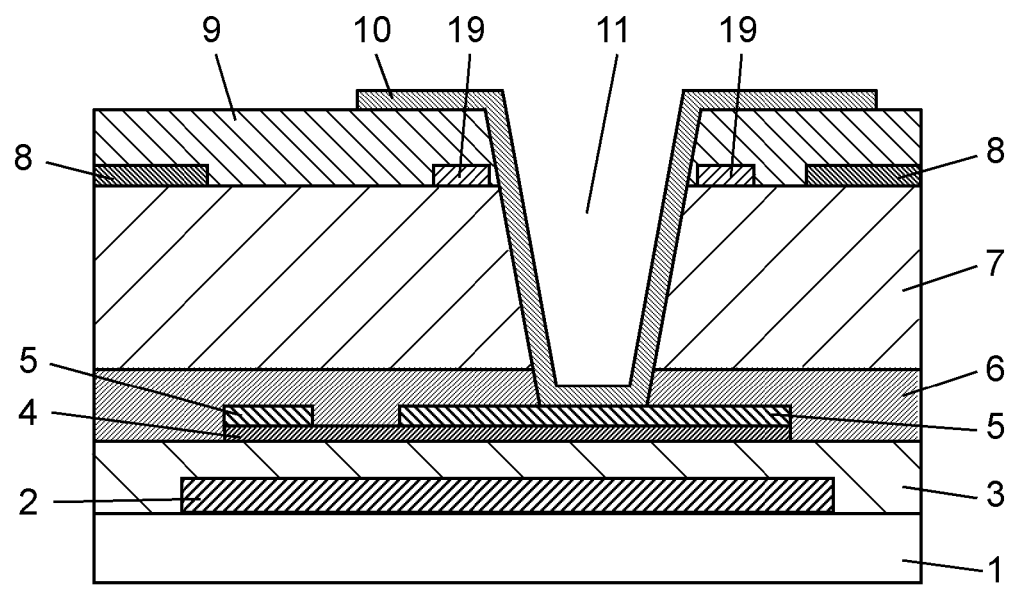
FIG. 2 is an outline sectional view of the switching element in FIG. 1, taken along line 2-2.
Figure 3:
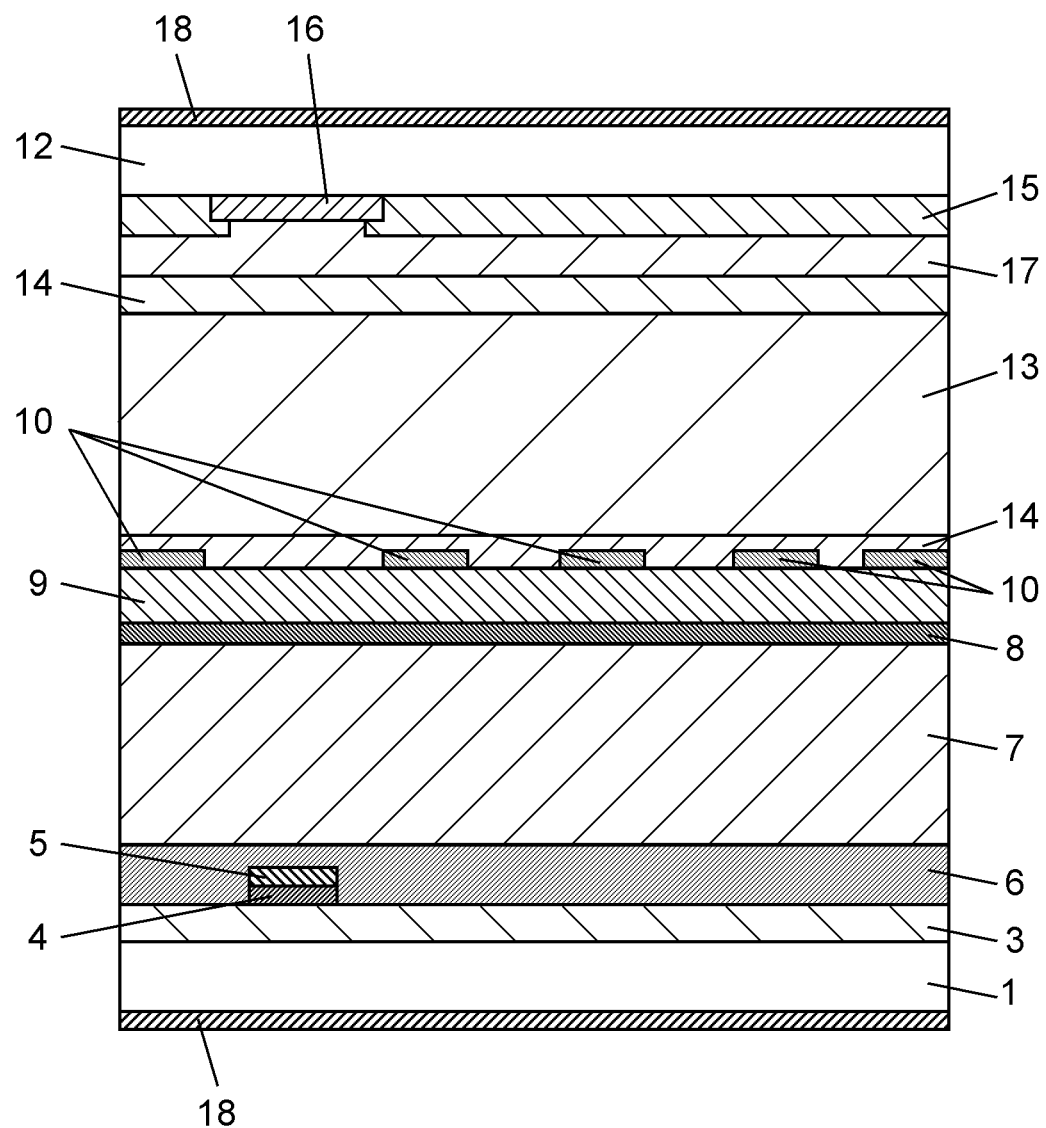
FIG. 3 is an outline sectional view of the liquid crystal layer in FIG. 1, taken along line 3-3.

FIG. 1 is a plan view showing the structure of the substantial part for one pixel, of a liquid crystal display device according to an embodiment of the present. FIG. 2 is an outline sectional view of the switching element in FIG. 1, taken along line 2-2. FIG. 3 is an outline sectional view of the liquid crystal layer in FIG. 1, taken along line 3-3. The liquid crystal display device shown in the figures is of an active matrix type, where multiple pixels are arranged in a matrix.

As shown in FIGS. 1, 2, and 3, a pair of transparent substrates 1 and 12 facing each other through liquid crystal layer 13 are disposed therebetween. Multiple gate electrodes 2 are formed in the predetermined pattern in the pixel regions of insulating, transparent substrate 1 (e.g. a glass substrate) closer to liquid crystal layer 13, directly or through a base layer. Then, gate insulating film 3 is formed on transparent substrate 1 so as to cover gate electrode 2. Gate insulating film 3 has semiconductor film 4 formed thereon. Source/drain electrode 5 is formed on semiconductor film 4 to form a thin-film transistor as a switching element.

Here, semiconductor film 4 is desirably formed of an amorphous oxide semiconductor of $InGaZnO_x$ including In—Ga—Zn—O. To form a film of the semiconductor, vapor phase deposition such as sputtering and laser deposition can be used with a polycrystalline sintered body having a composition of $InGaO_3(ZnO)_4$ for example as a target.

Gate electrode 2 is connected to signal line 2a. Source/drain electrode 5 is connected to signal line 5a. Signal lines 2a and 5a are formed so as to cross each other isolated by gate insulating film 3. Gate electrode 2 is formed integrally with signal line 2a that becomes a scanning signal line. Part of signal line 5a of source/drain electrode 5 combines as a video signal line, where both lines are connected to each other. Here, gate electrode 2, source/drain electrode 5, and signal lines 2a and 5a are formed of a single metal of Al, Mo, Cr, W, Ti, Pb, Cu, or Si; of a composite lamination (e.g. Ti/Al) of some of these metals; or of a metal compound layer (e.g. MoW, AlCu). In this embodiment, gate electrode 2 and source/drain electrode 5 are formed of Cr; alternatively, they may be formed of different materials.

On source/drain electrode 5 (i.e. a switching element), first insulating film 6, second insulating film 7, first electrode 8 as a common electrode, third insulating film 9, and second electrode 10 as a pixel electrode are successively laminated. Second electrode 10 is connected to source/drain electrode 5 (i.e. a thin-film transistor) through contact hole 11 collectively formed in the three-layered films: first insulating film 6, second insulating film 7, and third insulating film 9. In other words, first electrode 8 is provided on a switching element through first insulating film 6 and second insulating film 7 as insulating films. Second electrode 10 is provided on first electrode 8 through third insulating film 9 as an insulating film and is connected to the electrode of the switching element. The wall surface of contact hole 11 is covered with second electrode 10. Floating electrode 19 is formed in the peripheral region of contact hole 11.

First electrode 8, second electrode 10, and floating electrode 19 are formed of a transparent conductive film such as ITO (indium tin oxide). In the process of forming first electrode 8, floating electrode 19 is simultaneously formed so as to be present around the region where contact hole 11 is formed. First electrode 8 is supplied with a common potential that is different from a potential applied to second electrode 10. Hence, first electrode 8, second electrode 10, and third insulating film 9 form a retentive capacity that is in addition transparent, thereby increasing the aperture ratio during transmission display.

Here, third insulating film 9 is ideally a silicon nitride film formed by plasma CVD (chemical vapor deposition). A silicon nitride film has a dielectric constant higher than a coated insulating film made of an organic or inorganic material, and than a silicon oxide film, thereby increasing the retentive capacitance. Third insulating film 9 is desirably made closely packed by being formed at high temperature.

Second insulating film 7 is a coated insulating film made of an organic or inorganic material that is a SOG (spin on glass) material having Si—O bonds. As described later, using an SOG material for second insulating film 7 allows using collective dry etching of first insulating film 6 and third insulating film 9, thereby simplifying the manufacturing process. Further, film formation can be made by a common coater, which reduces the film forming cost itself compared to an inorganic insulating film such as first insulating film 6 and third insulating film 9 formed by a vacuum device. Further, a film thicker than an inorganic insulating film can be easily formed, thereby increasing flatness and reducing parasitic capacitance. Second insulating film 7 is formed of an SOG material having Si—O bonds, which has a heat resistance high enough to form third insulating film 9 at 240° C. or higher, thereby forming more reliable third insulating film 9.

As shown in FIG. 3, at the side of displaying images, insulating transparent substrate 12 as the common substrate, made of such as a glass substrate is disposed so as to face transparent substrate 1, and liquid crystal layer 13 is disposed between transparent substrates 1 and 12. Second electrode 10, which becomes a surface contacting liquid crystal layer 13 of transparent substrate 1, has oriented film 14 formed thereon. At the side contacting liquid crystal layer 13 of transparent substrate 12, oriented film 14 is disposed as well. The inner surface where oriented film 14 of transparent substrate 12 is formed has color filter 15 and black matrix 16 formed thereon. Then, overcoat 17 is formed so as to cover color filter 15 and black matrix 16, and oriented film 14 is formed on overcoat 17.

The outer surfaces of transparent substrates 1 and 12 have polarizing plate 18 disposed thereon. In FIG. 1, polarizing plate 18 is not shown. Further, such as a phase difference plate may be disposed on at least one of transparent substrates 1 and 12 as required.

Here, in a liquid crystal display device according to the embodiment, second electrode 10 has a linear part and is formed in a comb-teeth shape. First electrode 8 is formed in a sheet shape. Then, the liquid crystal display device generates an electric field parallel with transparent substrates 1 and 12 between second electrode 10 and first electrode 8 to drive liquid crystal layer 13 for displaying.

Next, a description is made of an example method of manufacturing liquid crystal display devices, according to an embodiment of the present invention using FIGS. 4A through 4E.

Figure 4A:
FIG. 4A is a sectional view showing an example manufacturing process in a method of manufacturing liquid crystal display devices, according to an embodiment of the present invention.

First, as shown in FIG. 4A, transparent substrate 1 is prepared to form a metal film made of such as Cr over the entire surface of substrate 1 by sputtering for example. Then, selectively the metal film is etched by photolithography technique to form gate electrode 2 together with signal lines.

Figure 4B:
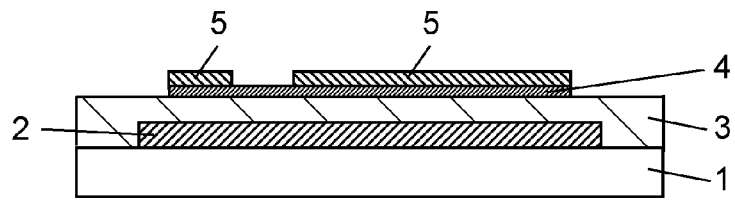
FIG. 4B is a sectional view showing an example manufacturing process in the method.

Next, as shown in FIG. 4B, gate insulating film 3 is formed made of an SiN film over the entire surface of transparent substrate 1 including gate electrode 2 by plasma CVD or sputtering for example. At this moment, as film forming conditions, the film forming temperature (substrate temperature) is 380° C. and the film thickness is 300 nm. Further, successively an a-Si layer (or an a-Si layer doped with n-type impurities) is formed over the entire surface of gate insulating film 3 by CVD for example. Furthermore, a metal film made of such as Cr is formed over the entire surface of the a-Si layer by sputtering for example. Then, selectively the a-Si layer and the metal film are etched simultaneously by photolithography technique to form semiconductor film 4 for a thin-film transistor (hereinafter, abbreviated as TFT) and source/drain electrode (including signal lines) 5.

Figure 4C:
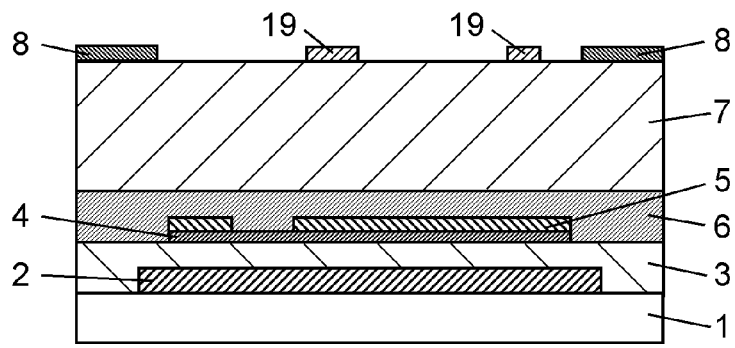
FIG. 4C is a sectional view showing an example manufacturing process in the method.

Next, as shown in FIG. 4C, first insulating film 6 made of SiN is formed over the entire surface of transparent substrate 1 including source/drain electrode 5 (channel region) by such as plasma CVD and sputtering. Further, the entire surface of first insulating film 6 is applied with an SOG material having Si—O bonds, and then is baked them at 250° C. for 60 minutes in an oven for heat curing process to form second insulating film 7. The thickness of second insulating film 7 formed here is preferably 1.5 to 4.0 μm. A thickness of less than 1.5 μm unpreferably causes uneven parts at positions where such as TFTs are present, and furthermore at first electrode 8 and second electrode 10 formed in the following step. A thickness of more than 4.0 μm unpreferably increases the light absorption rate due to second insulating film 7 to decrease the brightness of the display area.

Further, an ITO film is formed over the entire surface of second insulating film 7 by sputtering for example. Then, selectively the ITO film is etched by photolithography technique to form first electrode 8 and floating electrode 19 with a thickness of 55 nm. Here, first electrode 8 is electrically connected to the common wiring wired on the frame region of the liquid crystal display device. Floating electrode 19 is formed so as to be present in the peripheral region of contact hole 11 processed in the subsequent step.

Figure 4D:
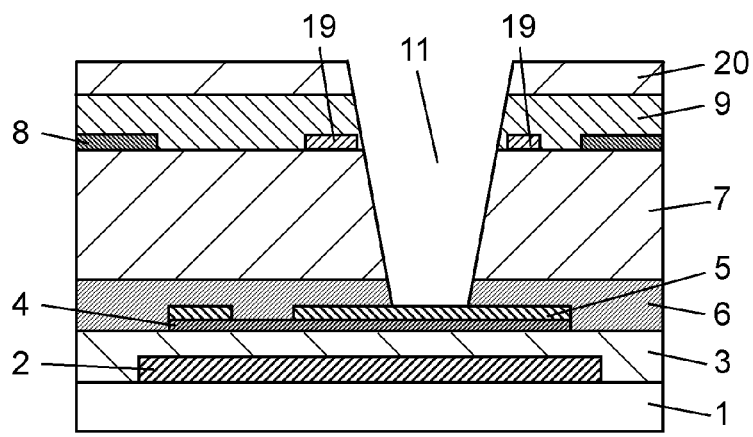
FIG. 4D is a sectional view showing an example manufacturing process in the method.

Next, as shown in FIG. 4D, third insulating film 9 made of SiN is formed, which has a favorable insulation performance, for example, over the entire surface of second insulating film 7 including first electrode 8 by such as plasma CVD and sputtering. At this moment, as film forming conditions, the film forming temperature (substrate temperature) can be 230° C. to 300° C. since second insulating film 7 at the layer lower than third insulating film 9 is an SOG material with a higher heat-resisting temperature. Hence, third insulating film 9 can be formed that is more closely packed and more reliable than the case where second insulating film 2 is made of a conventional resin film.

At this moment, the gas flow ratio of mono-silane ($SiH_4$) to ammonia ($NH_3$) (both are material gases for forming a film by plasma CVD) is set to 1:6 when forming a regular bulk layer of an insulating film. Then, halfway through the process, the gas flow amount of ammonia ($NH_3$) is increased to make the ratio 1:16 for example. In this way, the etching rate near the surface of the insulating film is desirably higher than that at the other part (bulk layer). The film thickness of the part with the higher etching rate is desirably between 5% and 30% of that of the insulating film, and more desirably approximately between 8% and 12%. By thus forming a film (recess layer) with a high etching rate near the surface, contact hole 11 can be formed in a normal tapered shape. In other words, as shown in FIG. 4D, contact hole 11 can be formed so that hole 11 closer to its opening has a larger diameter compared to its bottom.

To obtain desired moisture resistance and insulation performance of the channel region of TFTs and source/drain electrode 5, the thickness of third insulating film 9 is appropriately 100 nm or more. A thickness exceeding 1,000 nm produces a lower capacitance between first electrode 8 and second electrode 10, which unpreferably prevents sufficient write voltage to be applied to the liquid crystal and requires a higher voltage for driving liquid crystal molecules.

After that, photosensitive resist mask 20 is formed on third insulating film 9. Next, contact hole 11 is formed for each pixel by dry etching so as to collectively penetrate the three-layered insulating films (i.e. first insulating film 6 covering source/drain electrode 5, second insulating film 7, and third insulating film 9), and part of source/drain electrode 5 is exposed once again. A mixed gas of $O_2$ and one of such as $SF_6$, $CHF_3$, and $CF_4$ is used as an etching gas for dry etching. As a result that the three-layered insulating films are thus collectively etched, some manufacturing steps such as a photolithography step are eliminated and the load of an exposing step (exposure, photo-reaction process) is reduced to lower costs, compared to conventional liquid crystal display devices that are produced by patterning (forming a contact hole) by photolithography technique using a photosensitive resin material as second insulating film 7.

Further, second insulating film 7 interposed between first insulating film 6 and third insulating film 9, both inorganic insulating films made of such as SiN, is an SOG material having Si—O bonds. Hence, uneven parts are not generated in each layer after dry etching. In addition, as a result that the selection ratio of second insulating film 7 to photoresist is 2.5 or more and the etching rate of second insulating film 7 is 500 nm/min or higher, plasma does not damage second insulating film 7, thereby allowing stable patterning.

In third insulating film 9, floating electrode 19 is formed simultaneously with first electrode 8 in the peripheral region of contact hole 11, where this floating electrode 19 prevents hole 11 to broaden when hole 11 is formed. Accordingly, even when contact hole 11 is formed by collectively etching the three-layered insulating films, highly accurate hole 11 can be formed.

Figure 4E:
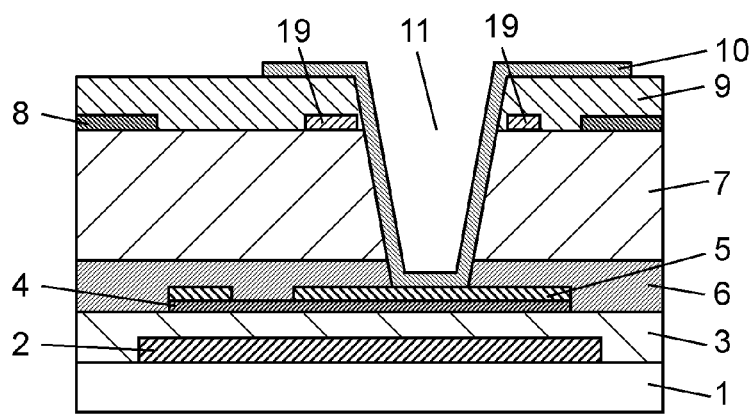
FIG. 4E is a sectional view showing an example manufacturing process in the method.

As shown in FIG. 4E, after forming contact hole 11, resist mask 20 is removed. After that, the entire of third insulating film 9 and contact hole 11 are coated with a transparent conductive material made of ITO so as to cover them. Then, second electrode (pixel electrode) 10 is formed by photolithography and etching, where the film thickness is 75 nm. In this case, part of the transparent conductive material is film-formed inside contact hole 11, which causes second electrode (pixel electrode) 10 to be electrically connected to source/drain electrode 5.

In this embodiment, a SiN film is used as third insulating film 9; alternatively, an insulating film containing oxygen (e.g. $SiO_2$, SiON) as third insulating film 9 at least contacting the ITO may be used in order to reliably avoid whitish turbidness on the ITO.

The description is made of the case where first insulating film 6 is formed on source/drain electrode 5; however, first insulating film 6 is not necessarily required depending on such as the degree of reliability demanded. The present invention exhibits an advantage of increasing the retentive capacity even with second insulating film 7 formed directly on source/drain electrode 5. Even with such a structure, an SOG material as second insulating film 7 provides a higher reliability than a resin material. Further, the description is made of the case where a SiN film is formed as an insulating film, but not limited to the case. A laminated film containing $SiO_2$, SiO, or SiN may be formed in such as a two-layer structure made from $SiO_2$ and SiN.

In third insulating film 9, floating electrode 19 is formed simultaneously with first electrode 8 in the peripheral region of contact hole 11. Hence, even when contact hole 11 is formed by collectively etching the three-layered insulating films, highly accurate hole 11 can be formed, and so can be second electrode 10.

Industrial Applicability

The present invention is useful in that it provides a liquid crystal display device with a high aperture ratio (transmittance) at low cost.

REFERENCE MARKS IN THE DRAWINGS 1, 12 Transparent substrate
2 Gate electrode
3 Gate insulating film
4 Semiconductor film
5 Source/drain electrode
6 First insulating film
7 Second insulating film (SOG material having Si—O bonds)
8 First electrode
9 Third insulating film
10 Second electrode
11 Contact hole
13 Liquid crystal layer
19 Floating electrode

The invention claimed is:

1. A liquid crystal display device comprising:
a pair of transparent substrates facing each other through a liquid crystal layer disposed therebetween;
a switching element made of a thin-film transistor comprising a gate electrode formed in a pixel region, a gate insulating film formed so as to cover the gate electrode, a semiconductor layer disposed on the gate insulating film and an electrode;
a first insulating film disposed on the switching element;
a first electrode disposed above the switching element through the first insulating film;
a second insulating film disposed on the first electrode;
a contact hole formed in the first insulating film and in the second insulating film and reaching the electrode of the switching element; and
a second electrode disposed over the first electrode through the second insulating film, extending along the contact hole to the electrode of the switching element, and connected to the electrode of the switching element,
wherein an electrically floating electrode is formed in a peripheral region of the contact hole on the first insulating film over the switching element.

2. A method of manufacturing a liquid crystal display device comprising:
a pair of transparent substrates facing each other through a liquid crystal layer disposed therebetween;
a switching element made of a thin-film transistor comprising a gate electrode formed in a pixel region, a gate insulating film formed so as to cover the gate electrode, a semiconductor layer disposed on the gate insulating film and an electrode;
a first insulating film disposed on the switching element;
a first electrode disposed above the switching element through the first insulating film;
a second insulating film disposed on the first electrode; and
a contact hole formed in the first insulating film and the second insulating film, the method comprising the successive steps of:
forming the first insulating film on the switching element;
forming the first electrode on the first insulating film on the switching element by patterning while forming an electrically floating electrode in a peripheral region in which the contact hole is to be formed;
forming the second insulating film on the first electrode;
forming the contact hole collectively in the first and second insulating films to expose part of the electrode of the switching element; and
forming a second electrode so as to connect the electrode of the switching element.

3. The liquid crystal display device of claim 1, wherein the electrically floating electrode surrounds the contact hole.

4. The method of claim 2, wherein the electrically floating electrode surrounds the contact hole.

5. A liquid crystal display device comprising:
a pair of transparent substrates facing each other through a liquid crystal layer disposed therebetween;
a thin-film transistor having an electrode;
a first insulating film disposed on the thin-film transistor;
a first electrode disposed above the thin-film transistor through the first insulating film;
a second insulating film disposed on the first electrode;
a contact hole formed in the first insulating film and in the second insulating film and reaching the electrode of the thin-film transistor;
a second electrode disposed over the first electrode through the second insulating film, extending along the contact hole to the electrode of the thin-film transistor, and connected to the electrode of the thin-film transistor; and
a third electrode formed to surround the contact hole, the third electrode being disposed only on the first insulating film and not disposed in the contact hole.

* * * * *